United States Patent
Li et al.

(10) Patent No.: US 10,519,771 B2
(45) Date of Patent: Dec. 31, 2019

(54) ROCK BREAKING SEISMIC SOURCE AND ACTIVE SOURCE THREE-DIMENSIONAL SEISMIC COMBINED ADVANCED DETECTION SYSTEM USING TUNNEL BORING MACHINE

(71) Applicant: SHANDONG UNIVERSITY, Jinan, Shandong (CN)

(72) Inventors: Shucai Li, Jinan (CN); Bin Liu, Jinan (CN); Xinji Xu, Jinan (CN); Jie Song, Jinan (CN); Lichao Nie, Jinan (CN); Lei Yang, Jinan (CN); Chunjin Lin, Jinan (CN); Weimin Yang, Jinan (CN)

(73) Assignee: SHANGDONG UNIVERSITY, Shandong (CN)

( * ) Notice: Subject to any disclaimer, the term of this patent is extended or adjusted under 35 U.S.C. 154(b) by 224 days.

(21) Appl. No.: 15/515,475

(22) PCT Filed: May 7, 2015

(86) PCT No.: PCT/CN2015/078479
§ 371 (c)(1),
(2) Date: Mar. 29, 2017

(87) PCT Pub. No.: WO2016/141630
PCT Pub. Date: Sep. 15, 2016

(65) Prior Publication Data
US 2017/0218757 A1  Aug. 3, 2017

(30) Foreign Application Priority Data

Mar. 11, 2015  (CN) .......................... 2015 1 01064452
Mar. 11, 2015  (CN) .................... 2015 2 01381068 U

(51) Int. Cl.
*E21D 9/11*  (2006.01)
*G01V 1/30*  (2006.01)
(Continued)

(52) U.S. Cl.
CPC .............. *E21D 9/108* (2013.01); *E21C 37/20* (2013.01); *E21D 9/003* (2013.01); *E21D 9/112* (2013.01);
(Continued)

(58) Field of Classification Search
CPC . E21C 37/20; E21D 9/003; E21D 9/11; E21D 9/111; E21D 9/112; E21D 9/113;
(Continued)

(56) References Cited

U.S. PATENT DOCUMENTS 4,167,290 A * 9/1979 Yamazaki ............... E21D 9/093
175/50
4,391,336 A * 7/1983 Coon ........................ E21B 7/04
175/45

(Continued)

FOREIGN PATENT DOCUMENTS

CN  102681004 A  9/2012
WO  00/17489 A2  3/2000
(Continued)

OTHER PUBLICATIONS

Dec. 16, 2015 International Search Report issued in International Patent Application No. PCT/CN2015/078479.
(Continued)

*Primary Examiner* — Janine M Kreck
*Assistant Examiner* — Michael A Goodwin
(74) *Attorney, Agent, or Firm* — Oliff PLC

(57) ABSTRACT

A rock breaking seismic source and active source three-dimensional seismic combined detection system uses a tunnel boring machine for three-dimensional seismic combined detection by active seismic source and rock breaking seismic source methods. Long-distance advanced prediction and position recognition of a geological anomalous body are realized using the active source seismic method. Machine
(Continued)

construction is adjusted and optimized according to the detection result; real-time short-distance accurate prediction of the body is realized using the cutter head rock breaking vibration having weak energy but containing a high proportion of transverse wave components as seismic sources and adopting an unconventional rock breaking seismic source seism recording and handling method. An area surrounding rock quality to be excavated is represented and assessed. A comprehensive judgment is made to the geological condition in front of the working face with the results of active source and rock breaking seismic source three-dimensional seismic advanced detection.

18 Claims, 4 Drawing Sheets

(51) Int. Cl.
*E21C 37/20* (2006.01)
*E21D 9/10* (2006.01)
*G01V 1/16* (2006.01)
*E21D 9/00* (2006.01)
*G01V 1/04* (2006.01)

(52) U.S. Cl.
CPC ............... *G01V 1/04* (2013.01); *G01V 1/162* (2013.01); *G01V 1/30* (2013.01); *G01V 2210/32* (2013.01)

(58) Field of Classification Search
CPC ......... E21D 9/115; E21D 9/116; E21D 9/117; E21D 9/118; G01V 1/36; G01V 1/364; G01V 1/282; G01V 1/30; G01V 2210/56; G01V 2210/32
USPC ............. 299/1.05, 1.2, 1.1, 1.3, 1.4, 1.8, 14; 175/1; 702/14, 17
See application file for complete search history.

(56) References Cited

U.S. PATENT DOCUMENTS 6,094,986 A * 8/2000 Wortman ................ G01S 7/521
173/20
8,863,861 B2 10/2014 Zientarski

FOREIGN PATENT DOCUMENTS

WO 2009/077102 A2 6/2009
WO WO-2011107955 A1 * 9/2011 ............. E21D 9/003

OTHER PUBLICATIONS

Dec. 16, 2015 Written Opinion issued in International Patent Application No. PCT/CN2015/078479.

* cited by examiner

ROCK BREAKING SEISMIC SOURCE AND ACTIVE SOURCE THREE-DIMENSIONAL SEISMIC COMBINED ADVANCED DETECTION SYSTEM USING TUNNEL BORING MACHINE

FIELD OF THE INVENTION

The present invention relates to a rock breaking seismic source and active source three-dimensional seismic combined advanced detection system using a tunnel boring machine.

BACKGROUND OF THE INVENTION

Tunnel construction generally adopts full-section boring machine construction and drilling and blasting construction. Compared with the traditional drilling and blasting method, the tunnel boring machine construction has significant advantages of high mechanization degree, high construction speed and the like, so more than 80% of tunnels are constructed by adopting the boring machine construction in developed countries including Japan, United States, Europe and the like, and tunnel boring machines will be increasingly applied with continuous development of tunnel construction in China. Numerous engineering practices show that the tunnel boring machines have poor adaptability to the changes of geological conditions, and such geological disasters as water and mud outburst, collapse and the like always happen at bad geological sections, easily resulting in major accidents such as machine blockage and even machine destruction and death, etc. In order to avoid the geological disasters and safety accidents in construction of the tunnel boring machines, the most effective solution is to find out bad geological conditions in front of working faces in advance by adopting an advanced geological detection technology, so as to previously make reasonable disposal measures and construction plans.

However, the advanced geological detection method and technology in boring machine constructed tunnels are acknowledged difficulties in tunnel engineering at home and abroad, and the basic reason lies in particularity and complexity of the boring machine constructed tunnels:

(1) the tunnel boring machine has a complex metal structure and an electric system, and is quite serious in electromagnetic interference;

(2) the tunnel boring machine has huge size and occupies most tunnel space in back of a working face, so that the observation space available for advanced geological detection is very small; and (3) the tunnel boring machine is high in excavation speed and close in procedure connection, and leaves a little time for the advanced geological detection. Under the restriction of these factors, good application of the advanced geological detection method often used in drilling and blasting constructed tunnels is difficult to realize in the boring machine constructed tunnels.

Thus, some advanced geological detection methods special for the boring machine constructed tunnels were proposed at home and abroad, but still have some problems:

(1) a BEAM (Bore-Tunneling Electrical Ahead Monitoring) system launched by Geohydraulic Data in Germany, wherein BEAM is a one-dimensional focusing induced polarization method, has short detection distance, and is highly influenced by electromagnetic interference, complex in installation of test equipment and time-consuming, and thus the construction progress is influenced;

(2) seismic wave advanced geological detection methods such as SSP (Sonic Softground Probing) and ISIS (Integrated Seismic Imaging System), wherein the observation mode is relatively simple, and the effective three-dimensional spatial observation mode is not adopted, so that the spatial positioning effect of an anomalous body is poor and the spatial resolution is also not ideal; and (3) Chinese invention patents GEOLOGICAL ADVANCED PREDICTION METHOD SUITABLE FOR TBM CONSTRUCTION and TUNNEL BORING-ALONG SEISMIC ADVANCED DETECTION DEVICE AND METHOD TAKING BORING MACHINE AS SEISMIC SOURCE use a seismic while drilling method in petroleum logging for reference, proposed was advanced geological detection taking rock cutting signals as a seismic source, the former substantially uses a handling method of HSP in drill blast tunnels but does not adopt proper de-noising means for strong interference noise of rock breaking vibration of a boring machine, the latter mainly aims at a common cantilever-type boring machine in mine roadways, the cantilever-type boring machine has only one cutting head, only one seismic source signal reception sensor is arranged on a boring machine boom in back of the cutting head, whereas a tunnel boring machine has a huge cutter head and numerous hobs for breaking rock, and the rock breaking vibration difference between different hobs is large, so it is difficult to obtain accurate and comprehensive rock breaking vibration features by adopting the single sensor.

In conclusion, because of advantages in geological body characterization and positioning in combination with long detection distance, the seismic method is an indispensable method in advanced geological detection of boring machine constructed tunnels, but the existing seismic wave advanced detection method for boring machine constructed tunnels still has the following problems:

(1) the reception sensor is simple in spatial arrangement form, and does not adopt an effective three-dimensional spatial observation mode, so it is difficult to acquire accurate three-dimensional wave field information of surrounding rock, resulting in poor spatial positioning effect of an anomalous body, and problems such as missing report, erroneous report, misreport and the like are likely to occur;

(2) regarding an active source seismic method, it needs detection using the maintenance downtime of a boring machine as much as possible in order not to influence the normal construction of the boring machine, and the existing methods lack a quick installation device and method special for boring machine constructed tunnels, resulting in low detection efficiency and influencing the normal construction of the boring machine;

(3) regarding a rock breaking seismic source seismic method, on the one hand, the difference between the rock breaking mode of a boring machine cutter head and the single-head rock breaking mode of a cantilever-type tunnel boring machine for oil drilling and coal mine is not considered, i.e., the tunnel boring machine has a huge cutter head and numerous hobs for breaking rock, the rock breaking vibration difference between different hobs is large, whereas the existing method merely adopts a single seismic source sensor, so accurate and comprehensive rock breaking vibration features are difficult to obtain; on the other hand, the existing disposal method does not include special noise removal for seismic source signals and received signals respectively, so that the seism recording signal-to-noise ratio is relatively low and the detection precision is influenced; and (4) in an active source seismic method, an air hammer or a magnetostrictor knocks a tunnel side wall or a working face to generate seismic wave at the maintenance downtime of the boring machine, and the excitation energy is relatively strong, so the method is suitable for long-distance advanced detection; the rock breaking seismic source seismic method uses the rock breaking vibration of the cutter head in the working process of the tunnel boring machine as a seismic source, and the excitation energy is relatively weak but contains a high proportion of transverse wave component, so the method is advantageous in short-distance accurate detection; the two methods are strongly complementary in working time and detection distance, the organic combination of the two methods can further improve the accuracy and the reliability of seismic method advanced prediction results, but the prior art does not well combine the two methods.

SUMMARY OF THE INVENTION

In order to solve the above problems, the present invention provides a rock breaking seismic source and active source three-dimensional seismic combined advanced detection system using a tunnel boring machine for three-dimensional seismic combined advanced detection by comprehensively using an active seismic source method and a rock breaking seismic source method, and its basic thought is as follows: firstly, three-dimensional full-space flexible and quick arrangement of three-component detectors is realized in a boring machine constructed tunnel by using reception sensor supporting devices; secondly, before the tunnel boring machine starts to work, seismic wave is excited by an active seismic source with strong excitation energy, reflected by a wave impedance interface and then received by the three-component detectors in close contact with tunnel walls, the acquired seismic wave information is automatically processed by using a conventional seism recording and handling method, to realize long-distance advanced prediction of a geological anomalous body within a range of 120 m in front of a working face; in the working process of the tunnel boring machine, real-time short-distance accurate prediction of the geological anomalous body is realized by taking cutter head rock breaking vibration with weak excitation energy as a seismic source and adopting an unconventional rock breaking seismic source seism recording and handling method, and the quality of surrounding rock of an area to be excavated is represented and assessed; and finally, a comprehensive judgment is given for the geological condition in front of the working face in combination with the results of active source and rock breaking seismic source three-dimensional seismic advanced detection, thereby providing a support for optimization of boring machine working parameters and construction safety control.

In order to fulfill the above purposes, the present invention adopts the following technical solution:

A rock breaking seismic source and active source three-dimensional seismic combined advanced detection system using a tunnel boring machine includes an excitation system, reception sensors and supporting devices thereof, a rock breaking seismic source sensor array, noise sensors, a control system and a multi-channel seismic wave data acquisition instrument;

the excitation system can be divided into working face seismic sources and a side wall seismic source according to different positions, the working face seismic sources are arranged on a boring machine cutter head, the side wall seismic source is arranged on a boring machine main shaft, the cutter head is fixed on the boring machine main shaft, and three groups of reception sensors and supporting devices thereof distributed annularly taking the main shaft as a center are arranged at the middle section of the boring machine main shaft, correspond to the vault and the left and right haunches of a tunnel respectively and are used for receiving seismic signals reflected after the rock breaking vibration of the cutter head encounters a bad geological body when being propagated in a stratum;

the rock breaking seismic source sensor array is installed in back of the boring machine cutter head, rock breaking seismic source sensors are installed in back of the cutter head according to the distribution condition of hobs on the cutter head, and a plurality of rock breaking seismic source sensors constitute the rock breaking seismic source sensor array;

the boring machine working noise sensors are installed at boring machine noise sources, and are used for recording noise signals generated by noise sources; the control system controls the vibration condition and the motion of the excitation system;

the multi-channel seismic wave data acquisition instrument is connected with the rock breaking seismic source sensor array, three-component detectors and the boring machine working noise sensors respectively, and is used for storing and processing seismic wave information recorded by the detectors.

The excitation system is divided into working face seismic sources and a side wall seismic source according to different positions; each working face seismic source includes a controllable seismic source, a seismic source pressure sensor, a seismic source hydraulic telescopic rod and a seismic source access hatch; and the side wall seismic source includes a controllable seismic source, a seismic source pressure sensor, a seismic source hydraulic telescopic rod and a seismic source guide rail; a plurality of working face seismic sources are arranged on the boring machine cutter head symmetrically, proper positions of the working face seismic sources are selected according to the distribution condition of hobs on the cutter head, in addition, a plurality of working face seismic source accesses are also reserved at corresponding positions of the cutter head, and the seismic source access hatches move according to preset clamping grooves under the control of the control system to open and close the seismic source accesses and realize entry and exit of the working face seismic sources;

the side wall seismic source is positioned on the seismic source guide rail, the seismic source guide rail includes a circular slip ring guide rail and a rail along the boring machine main shaft, and the controllable seismic source freely slides on the seismic source guide rail in the front-back direction of the main shaft and simultaneously can freely rotate 360° around the main shaft, thereby realizing three-dimensional random arrangement of the side wall seismic source;

the controllable seismic source and the seismic source pressure sensor are installed at the top of the seismic source hydraulic telescopic rod, and the controllable seismic source, the seismic source pressure sensor and the seismic source hydraulic telescopic rod are respectively connected with the control system via connecting lines, wherein the seismic source hydraulic telescopic rod adopts a hollow design mode.

Three groups of reception sensors and supporting devices thereof are distributed annularly taking the boring machine main shaft as a center, respectively correspond to the vault and the left and right haunches of a tunnel, and specifically include a three-component detector, a detector pressure sensor, a front hydraulic supporting rod, a rear hydraulic supporting rod, radial hydraulic supporting rods, a supporting plate and a supporting device guide rail respectively, wherein one end of the front hydraulic supporting rod is connected with the boring machine main shaft while the other end is connected with one end of the supporting plate, the other end of the supporting plate is connected with one end of the rear hydraulic supporting rod, and the other end of the rear hydraulic supporting rod is connected to the boring machine main shaft; the supporting device guide rail is annularly nested into the boring machine main shaft, the radial hydraulic supporting rods are installed on the supporting device guide rail, the other ends of the radial hydraulic supporting rods are connected with the bottom surface of the supporting plate, and the three-component detector and the detector pressure sensor are installed on the supporting plate.

The rock breaking seismic source sensor array is installed in back of the boring machine cutter head, hobs are grouped according to the specific distribution condition of the hobs on the cutter head, a rock breaking seismic source sensor is installed at proper positions in back of each hob group, a plurality of rock breaking seismic source sensors constitute the rock breaking seismic source sensor array, the rock breaking seismic source sensors record rock breaking seismic source signals, the rock breaking seismic source signals include valid signals (i.e., rock breaking vibration signals of a corresponding hob group) and noise signals (i.e., rock breaking vibration signals of other hob groups, interference signals generated by boring machine noise sources), and each rock breaking seismic source sensor is also provided with a positioning unit which can acquire and record the spatial position thereof.

The boring machine working noise sensors are installed at the positions nearby boring machine noise sources (e.g., motor working noise, conveying belt working and vibrating noise, construction noise in back of the boring machine, etc.), and are used for recording noise signals generated by noise sources.

The multi-channel seismic wave data acquisition instrument is connected with the rock breaking seismic source sensor array, the three-component detectors and the boring machine working noise sensors respectively, and is used for storing and processing seismic wave information recorded by the detectors; the control system controls stretching of the seismic source hydraulic telescopic rods, the front hydraulic supporting rods, the rear hydraulic supporting rods and the radial hydraulic supporting rods, and performs feedback adjustment on the seismic source hydraulic telescopic rods, the front hydraulic supporting rods, the rear hydraulic supporting rods and the radial hydraulic supporting rods under the action of signals of the seismic source pressure sensors and the detector pressure sensors; in addition, the control system is also used for adjusting the vibration conditions of the controllable seismic sources, and simultaneously can control the movement of the seismic source guide rail, the supporting device guide rail and the seismic source access hatches.

A three-dimensional seismic combined advanced detection method using a tunnel boring machine, which uses the above devices, includes the following steps:

(1) when the tunnel boring machine stops working, three-dimensional full-space flexible and quick arrangement of three-component detectors is realized in a tunnel by using reception sensor supporting devices, supporting plates are adjusted so that the three-component detectors are in close contact with tunnel walls, controllable seismic sources excite on a working face and a side wall nearby the working face respectively, seismic wave is reflected by a wave impedance interface and then received by the three-component detectors in close contact with the tunnel walls, the recorded seismic wave information is transmitted to the multi-channel seismic wave data acquisition instrument in real time, the acquired seismic wave information is automatically processed according to a conventional seism recording and handling method to obtain longitudinal and transverse wave velocity models and a three-dimensional seismic profile within a long-distance range (0~120 m in front of the working face) and realize long-distance advanced prediction and position recognition of a geological anomalous body, and subsequent boring machine construction is adjusted and optimized according to the detection result;

(2) reasonable boring machine construction parameters are selected in combination with the long-distance advanced detection result, the boring machine starts to work, the cutter head rotates and cuts rock to generate vibration, the reception sensor supporting devices are closely combined with the excavation procedure of the boring machine to ensure that the absolute positions of the supporting plates and the three-component detectors in the tunnel are not changed, the rock breaking vibration of each hob group is received by a rock breaking seismic source sensor array installed in back of the cutter head, rock breaking seismic sources simultaneously excite seismic wave to be diffused to the front of the boring machine working face and four sides of the tunnel, the seismic wave is reflected by the wave impedance interface and received by the three-component detectors in close contact with the tunnel walls, meanwhile, boring machine working noise sensors continuously record noise signals generated by noise sources, the recorded information is transmitted to the multi-channel seismic wave data acquisition instrument in real time, the acquired seismic wave information is automatically processed according to an unconventional rock breaking seismic source seism recording and handling method to obtain longitudinal and transverse wave velocity models and a three-dimensional seismic profile within a short-distance range (0~60 m in front of the working face) and realize real-time short-distance prediction of the geological anomalous body, and the quality of surrounding rock of an area to be excavated is represented and assessed; and (3) finally, a comprehensive judgment is made to the geological condition in front of the working face and the quality of the surrounding rock in combination with the results of active source and rock breaking seismic source three-dimensional seismic advanced detection, and the judgment result is fed back to a boring machine operator in real time, thereby providing a support for optimization of boring machine working parameters and construction safety control.

In step (1), it is an initial state when the boring machine stops, the whole reception sensors and supporting devices thereof are in a retraction state, the supporting device guide rail and the supporting plates are positioned at the forefront of a movable path, the radial hydraulic supporting rods and the front hydraulic supporting rods are simultaneously in a contraction state, and the rear hydraulic supporting rods are in a stretching state.

The stretching state indicates that the upper ends of the hydraulic supporting rods stretch outwards from the lower ends under the drive of the hydraulic devices, and the whole hydraulic supporting rods are lengthened; and the contraction state indicates that the upper ends of the hydraulic supporting rods contract to the lower ends under the drive of the hydraulic devices, and the whole hydraulic supporting rods are shortened.

In step (1), when the advanced detection of the active source seismic method is to start, three-dimensional full-space flexible and quick arrangement of reception sensors is realized in a tunnel by using reception sensor supporting devices: the radial hydraulic supporting rods slowly elongate to drive the front hydraulic supporting rods and the rear hydraulic supporting rods to elongate at the same time, and the supporting plates are pushed out in combination with the angle adjusting function of hinges at each position till the three-component detectors contact the tunnel walls; in order to ensure that the three-component detectors can be in close contact with the tunnel walls and simultaneously prevent the three-component detectors from being damaged due to too long push-out distance of each hydraulic supporting rod, when the contact pressure between the three-component detectors and the tunnel walls reaches a certain value, the detector pressure sensors perform feedback adjustment on the control system to stop the motion of each hydraulic supporting rod, and then the three-component detectors are in close contact with the tunnel walls;

in step (1), the control system controls the seismic source hydraulic telescopic rods to slowly send the controllable seismic sources out; when the contact pressure between the seismic sources and the boring machine working face or the tunnel walls reaches a certain value, the seismic source pressure sensors perform feedback adjustment on the control system to stop the motion of the seismic source hydraulic telescopic rods, the control system controls the controllable seismic sources included in the excitation system to start on vibration and generate broadband seismic wave by excitation, and all signals are classified and stored in the multi-channel seismic wave data acquisition instrument.

In step (1), the conventional seism recording and real-time automatic handling method comprises:

(1-1) channel gather edition: bad channel removal and valid data length interception are realized for highlighting later handling keys, thereby improving the handling efficiency;

(1-2) spherical wave diffusion real amplitude compensation: amplitude loss caused by wave-front spherical geometric diffusion of seismic wave is compensated to keep relatively real amplitude;

(1-3) spectral analysis and band-pass filtering: seismic signals are transformed from a time domain to a frequency domain by adopting Fourier transform, thereby achieving a filtering effect according to the spectral difference between valid wave and interference wave and improving the signal-to-noise ratio of seism records;

(1-4) first arrival wave pickup: the first arrival time of longitudinal and transverse wave is automatically determined by adopting a variable time window statistical energy ratio method, thereby providing necessary and reliable parameters for subsequent data processing operation;

(1-5) static correction of shot points: the detectors and the seismic sources are corrected to the same reference plane, and the leading or lag effect of each recorded channel seismic wave due to different seismic sources is eliminated;

(1-6) channel gather balance: the channel gather balance specifically includes intra-channel balance and inter-channel balance, the intra-channel balance is to compress shallow wave with strong energy and increase deep wave with weak energy, so that the amplitudes of the shallow and deep seismic wave are controlled within a certain dynamic range; the inter-channel balance is mainly to eliminate the excitation energy difference of different seismic source points, so that the amplitude of the reflected wave is not influenced by the excitation condition but only reflects the geological construction condition;

(1-7) valid reflected wave extraction: interference wave and invalid reflected wave in back of the boring machine working face are suppressed by adopting f-k and r-P combined filtering, merely valid reflected wave from the front and the sides of the boring machine working face is reserved and the valid reflected wave is automatically extracted;

(1-8) inverse Q filtering: energy and frequency attenuation caused by inelastic bodies in the stratum are compensated, and the stretching effect of a wavelet phase is corrected, thereby fulfilling the purposes of improving weak reflected energy, improving the continuity of co-phase axes and improving the resolution of seismic data;

(1-9) longitudinal and transverse wave separation: P wave, SH wave and SV wave received in three components of the three-component detectors are separated, thereby facilitating next migration imaging and geological interpretation;

(1-10) velocity analysis: longitudinal and transverse wave velocity models of rock in front of the boring machine working face are established respectively by repeated iteration of a time distance curve based on wave velocity pickup of first arrival wave; and (1-11) depth migration: migration is performed on longitudinal and transverse wave seism records respectively by adopting a depth migration method based on velocity analysis, so that the obtained seismic profile can clearly and accurately show the spatial form and the real position of the wave impedance interface.

In step (2), the boring machine starts to work, the cutter head and the boring machine main shaft slowly move forward while the cutter head continuously excavates the working face, the supporting device guide rail thus produces backward relative movement relative to the main shaft, the front hydraulic supporting rods are gradually elongated, the rear hydraulic supporting rods are gradually shortened, and the angles are continuously adjusted under the action of the hinges, thereby ensuring that the absolute positions of the supporting plates and the three-component detectors in the tunnel are not changed, that is, the supporting plates' and the three-component detectors do not move relative to the tunnel walls in the excavation process, and then ensuring that the sensors can well receive seismic signals.

In step (2), the cutter head rotates and cuts rock to generate vibration, the rock breaking vibration of each hob group is received by the rock breaking seismic source sensor array installed in back of the cutter head, the rock breaking seismic sources simultaneously excite seismic wave to be diffused to the front of the boring machine working face and four sides of the tunnel, the seismic wave is reflected by the wave impedance interface and received by the three-component detectors in close contact with the tunnel walls, meanwhile, the boring machine working noise sensors continuously record noise signals generated by noise sources, and the information recorded by the rock breaking seismic source sensors, the three-component detectors and the boring machine working noise sensors is transmitted to the multi-channel seismic wave data acquisition instrument in real time.

In step (2), when the boring machine cutter head and the main shaft reach the maximum strokes, the boring machine stops working, the radial hydraulic supporting rods are slowly shortened to drive the front hydraulic supporting rods and the rear hydraulic supporting rods to shorten, the whole reception sensors and supporting devices thereof are retracted in combination with the angle adjusting function of hinges at each position, and at the moment, the supporting device guide rail and the supporting plates are positioned at the rearmost end of the movable path; then, the supporting plates are driven by the supporting device guide rail to move forward to the forefront of the movable path together, correspondingly, the front hydraulic supporting rods are shortened, the rear hydraulic supporting rods are elongated, the reception sensors and supporting devices thereof are restored to the initial state, and next turn of operation can be continuously performed.

In step (2), the unconventional rock breaking seismic source seism recording and real-time automatic handling method includes:

(2-1) seismic source signal de-noising: blind source separation is performed on seismic source signals based on independent component analysis theory to separate noise signals from valid seismic signals, the value of the similarity coefficient between each separated signal and the seismic source signal corresponding to each hob group is further calculated, and the signal with the maximum similarity coefficient is a valid seismic source signal corresponding to the hob group and is still marked as the seismic source signal there;

(2-2) seismic source signal reconstruction: in view of the influence of rotation of the cutter head in the construction process of the boring machine, the seismic source signals de-noised in (2-1) need to be processed to reconstruct unified seismic source signals;

(2-3) received signal de-noising: the noise components in the received signals come from the boring machine noise sources, and in order to separate valid seismic signals, strong interference noise attenuation needs to be performed on the received signals in combination with the noise signals recorded by the boring machine working noise sensors;

(2-4) equivalent normalization of rock breaking signals: cross-correlation and de-convolution processing is performed on the seismic source signals and the de-noised received signals to further attenuate incoherent noise, and the rock breaking vibration signals are compressed into equivalent pulse signals to realize equivalent normalization of unconventional rock breaking seismic sources;

(2-5) the unconventional rock breaking seismic source seism record is transformed to the conventional seismic source seism record via (2-1)~(2-4) above, then filtering, first arrival pickup of P wave and S wave, wave field separation and migration imaging are continuously performed according to the conventional seism recording and real-time automatic handling method of (1-1)~(1-11), and longitudinal and transverse wave velocity models and a three-dimensional seismic profile in the front of the tunnel and surrounding areas are finally obtained;

(2-6) relatively accurate longitudinal and transverse wave velocity models within the short-distance range of rock in front of the tunnel working face are obtained in real time from the above rock breaking seismic source seism recording and handling result, mechanical parameters of the rock are further obtained by calculation, and the quality of the rock can be represented and assessed by integrating the distribution conditions of longitudinal and transverse wave velocities and the mechanical parameters of the rock.

The specific method of step (2-2) is as follows: a seismic source area is pre-assumed on the cutter head according to the distribution condition of hobs on the cutter head, only the hob group passing through this area is regarded as generating rock breaking vibration as the cutter head rotates, a signal recorded by the rock breaking seismic source sensor corresponding to the hob group within this period of time is regarded as a seismic source signal fragment within this period of time, thus, when the cutter head rotates one circle, all hob groups and corresponding rock breaking seismic source sensors pass through the seismic source area once, the corresponding seismic source signal fragment in each seismic source signal is respectively extracted according to the relative relation recorded automatically at any moment between the spatial position of each rock breaking seismic source sensor and the seismic source area, and the seismic source signal fragments are spliced into a seismic source signal according to a time sequence.

The present invention has the following advantages:

(1) in the present invention, three-dimensional seismic combined advanced detection is performed by comprehensively using an active seismic source mode and a rock breaking seismic source mode; before the boring machine starts to work, long-distance advanced prediction and position recognition of a geological anomalous body are realized using the active source seismic method with strong excitation energy, and subsequent boring machine construction is adjusted and optimized according to the detection result; in the working process of the boring machine, real-time short-distance accurate prediction of the geological anomalous body is realized using the cutter head rock breaking vibration having weak energy but containing a high proportion of transverse wave component as seismic sources, and the quality of surrounding rock of an area to be excavated is represented and assessed; and the accuracy and the reliability of the seismic method advanced prediction result can be further improved by effectively combining the two methods;

(2) the present invention is safe and reliable and does not influence the normal working flow of the boring machine by sufficiently using the downtime and the work time of the boring machine; meanwhile, aiming at the problem that accurate wave velocity distribution is difficult to obtain in the traditional linear observation methods, based on comprehensive consideration of the existing internal spatial environment and the detection effect of the tunnel boring machine, proposed is a reception sensor supporting device, which can realize three-dimensional full-space quick arrangement of a reception sensor in the tunnel, is convenient and fast, is closely combined with the excavation procedure of the boring machine and is thus particularly suitable for a boring machine constructed tunnel with "narrow observation space and short detection time";

(3) regarding the unconventional rock breaking seismic source seism recording and handling method, the cutter head of the tunnel boring machine is large in area, numerous hobs are used for breaking rock, and the rock breaking vibration difference between different hobs is large, so it is difficult to obtain accurate and comprehensive rock breaking vibration features by adopting the single rock breaking seismic source sensor; the present invention particularly puts forward a method for acquiring rock breaking vibration signals of each hob group via a rock breaking seismic source sensor array, puts forward a seismic source signal blind source separation method based on independent component analysis theory against the problem of serious noise interference among the hob groups to separate noise signals and valid seismic signals, and further puts forward a seismic source signal reconstruction method suitable for simultaneous measurement of a plurality of rock breaking seismic source sensors;

(4) aiming at the problem that reception sensor recorded signals have the problem of serious noise interference in the rock breaking seismic source seismic method, boring machine working noise sensors are installed nearby boring machine noise sources to record noise signals, and a method for performing strong interference noise attenuation on the reception sensor signals is put forward in combination with the recorded noise signals, so that the signal-to-noise ratio of rock breaking seismic source seism records can be effectively improved.

in which: 1, excitation system; 2, working face seismic source; 3, side wall seismic source; 4, reception sensor and supporting device thereof; 5, boring machine cutter head; 6, boring machine main shaft; 7, controllable seismic source; 8, seismic source pressure sensor; 9, seismic source hydraulic telescopic rod; 10, seismic source guide rail; 11, front hydraulic supporting rod; 12, supporting plate; 13, three-component detector; 14, detector pressure sensor; 15, rear hydraulic supporting rod; 16, radial hydraulic supporting rod; 17, supporting device guide rail; 18, hinge; 19-1~19-6, hob group; 20-1~20-6, rock breaking seismic source sensor; 21, seismic source area.

DETAILED DESCRIPTION OF THE EMBODIMENTS

The present invention will be further described below in combination with the accompanying drawings and embodiments.

Figure 1:
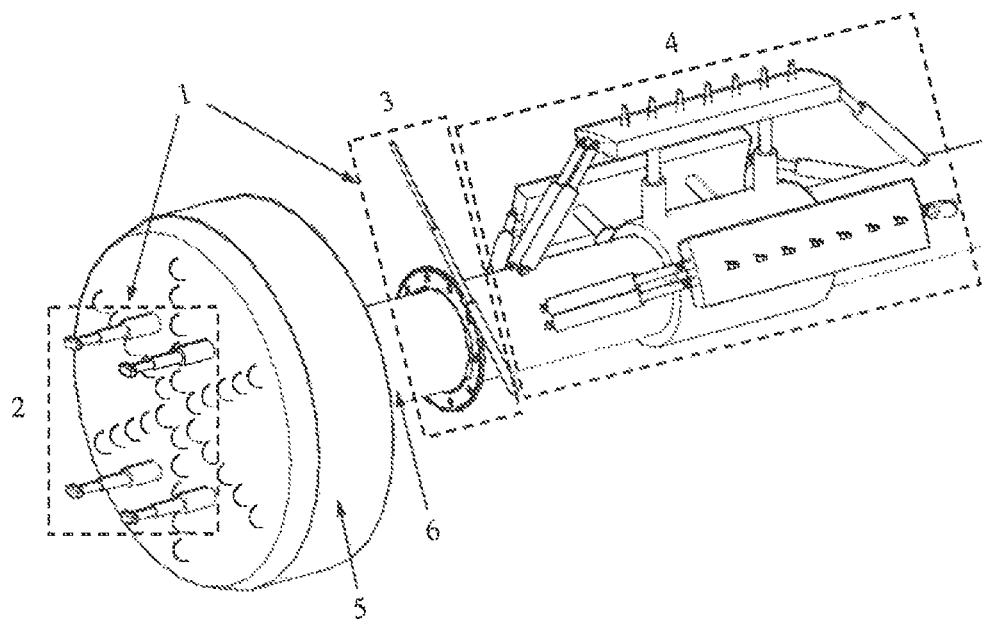
FIG. 1 is an overall schematic diagram of a rock breaking seismic source and active source three-dimensional seismic combined advanced detection device using a tunnel boring machine.

As shown in FIG. 1, an active source and rock breaking seismic source three-dimensional seismic combined advanced detection method and device used under the complex environment of a boring machine tunnel mainly include an excitation system 1, reception sensors and supporting devices thereof 4, a rock breaking seismic source sensor array, boring machine working noise sensors, a control system and a multi-channel seismic wave data acquisition instrument.

The excitation system is divided into working face seismic sources 2 and a side wall seismic source 3 according to different positions; each working face seismic source 2 includes a controllable seismic source 7, a seismic source pressure sensor 8, a seismic source hydraulic telescopic rod 9 and a seismic source access hatch; and the side wall seismic source includes a controllable seismic source 7, a seismic source pressure sensor 8, a seismic source hydraulic telescopic rod 9 and a seismic source guide rail 10.

Figure 2:
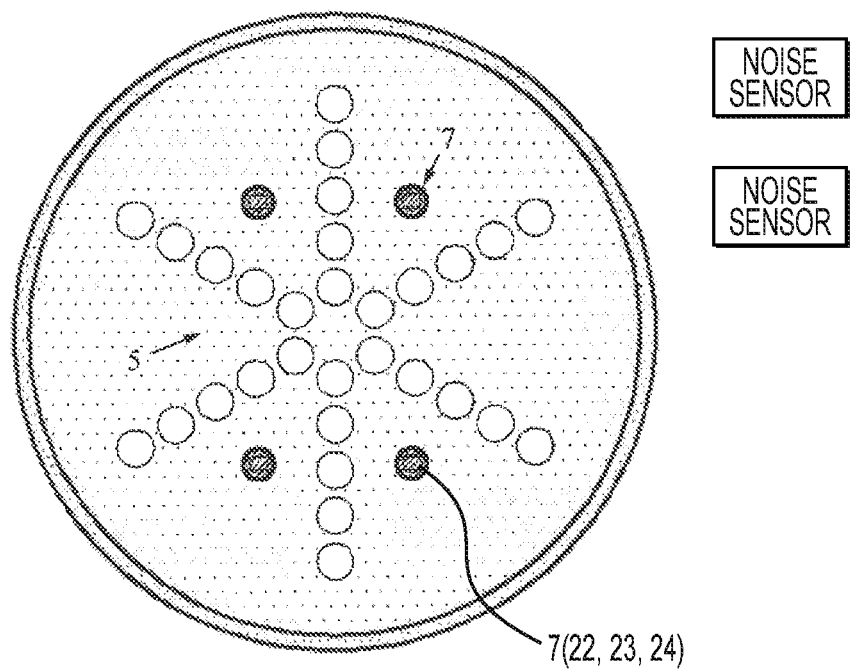
FIG. 2 is an arrangement diagram of working face seismic sources of the three-dimensional seismic combined advanced detection device.

As shown in FIG. 2, four working face seismic sources 2 are arranged on the boring machine cutter head 5 symmetrically, specific positions of the working face seismic sources 2 can be determined according to the distribution condition of hobs on the cutter head, in addition, four working face seismic source accesses 22 also need to be reserved at corresponding positions of the cutter head. The seismic source access hatches 23 can move according to preset clamping grooves 24 under the control of the control system to open and close the seismic source accesses 22 and realize entry and exit of the controllable seismic sources 7.

Figure 3:
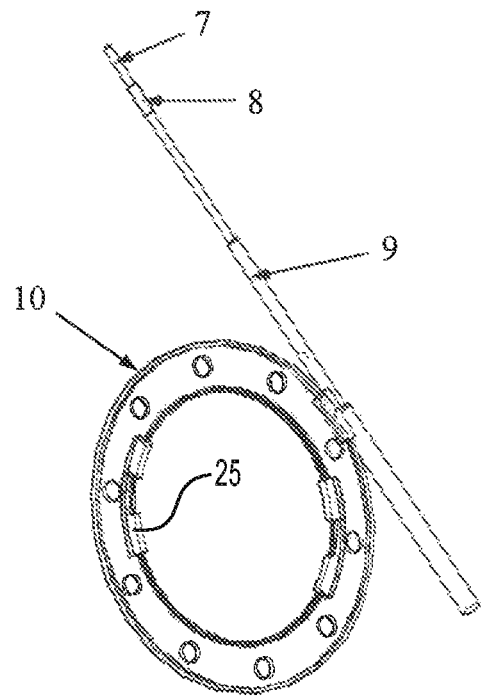
FIG. 3 is a schematic diagram of a side wall seismic source of the three-dimensional seismic combined advanced detection device.
Figure 4:
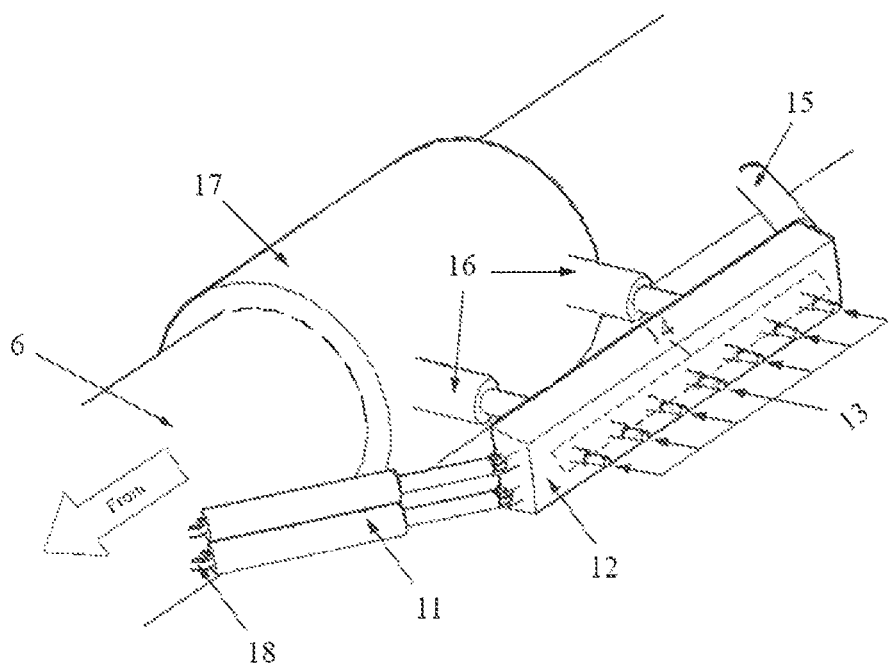
FIG. 4 is a structural schematic diagram of a reception sensor and a supporting device thereof.

As shown in FIG. 3, the side wall seismic source 3 is positioned on the seismic source guide rail 10, the seismic source guide rail 10 is designed as being composed of a circular slip ring guide rail and a rail 25 along a boring machine main shaft by using the internal space of the existing boring machine, and the controllable seismic source 7 can freely slide on the seismic source guide rail in the front-back direction of the main shaft 6 and simultaneously can freely rotate 360° around the main shaft 6, thereby realizing three-dimensional random arrangement of the side wall seismic source.

The controllable seismic source 7 and the seismic source pressure sensor 8 are installed at the top of the seismic source hydraulic telescopic rod 9, and the controllable seismic source 7, the seismic source pressure sensor 8 and the seismic source hydraulic telescopic rod 9 are respectively connected with the control system, wherein the seismic source hydraulic telescopic rod 9 adopts a hollow design mode, and connecting lines can be led out therefrom.

As shown in FIG. 1, three groups of reception sensors and supporting devices thereof 4 are distributed annularly taking the boring machine main shaft 6 as a center, respectively correspond to the vault and the left and right haunches of a tunnel, and are specifically composed of a three-component detector 13, a detector pressure sensor 14, a front hydraulic supporting rod 11, a rear hydraulic supporting rod 15, radial hydraulic supporting rods 16, a supporting plate 12; a supporting device guide rail 17, hinges 18 and the like respectively. One end of the front hydraulic supporting rod 11 is connected with the boring machine main shaft 6 while the other end is connected with one end of the supporting plate 12, the other end of the supporting plate 12 is connected with one end of the rear hydraulic supporting rod 15, the other end of the rear hydraulic supporting rod 15 is connected to the boring machine main shaft 6, and the connections above are all completed by the hinges 18. The supporting device guide rail 17 is annularly nested onto the boring machine main shaft 6, the radial hydraulic supporting rods 16 are installed on the supporting device guide rail, and the other ends of the radial hydraulic supporting rods 16 are connected with the bottom surface of the supporting plate 12. The three-component detector 13 and the detector pressure sensor 14 are installed on the supporting plate 12.

The rock breaking seismic source sensor array is installed in back of the boring machine cutter head 5; hobs are grouped according to the specific distribution condition of the hobs on the cutter head to obtain a hob group 19-1, a hob group 19-2, a hob group 19-3, a hob group 19-4, a hob group 19-5 and a hob group 19-6 respectively; rock breaking seismic source sensors are arranged at proper positions in back of the hob groups, and are respectively a rock breaking seismic source sensor 20-1, a rock breaking seismic source sensor 20-2, a rock breaking seismic source sensor 20-3, a rock breaking seismic source sensor 20-4, a rock breaking seismic source sensor 20-5 and a rock breaking seismic source sensor 20-6; a plurality of rock breaking seismic source sensors constitute the rock breaking seismic source sensor array; signals recorded by the rock breaking seismic source sensors are called seismic source signals, and the seismic source signals include valid signals (i.e., rock breaking vibration signals of a corresponding hob group) and noise signals (i.e., rock breaking vibration signals of other hob groups, interference signals generated by boring machine noise sources); meanwhile, each rock breaking seismic source sensor is also provided with a positioning unit which can transmit the spatial position thereof to the multi-channel seismic wave data acquisition instrument in real time.

The boring machine working noise sensors are installed at the positions nearby boring machine noise sources (e.g., motor working noise, conveying belt vibrating noise, construction noise in back of the boring machine, etc.), and are used for recording noise signals generated by noise sources.

The multi-channel seismic wave data acquisition instrument is connected with the rock breaking seismic source sensor array 20, the three-component detectors 13 and the boring machine working noise sensors respectively, and is used for storing and processing seismic wave information recorded by the detectors; the control system can control stretching of the seismic source hydraulic telescopic rods 9, the front hydraulic supporting rods 11, the rear hydraulic supporting rods 15 and the radial hydraulic supporting rods 16, and performs feedback adjustment on the hydraulic devices under the action of signals of the seismic source pressure sensors 8 and the detector pressure sensors 14; in addition, the control system is also used for adjusting the vibration conditions of the controllable seismic sources 7, and simultaneously can control the movement of the seismic source guide rail 10, the supporting device guide rail 17 and the seismic source access hatches.

Figure 5:
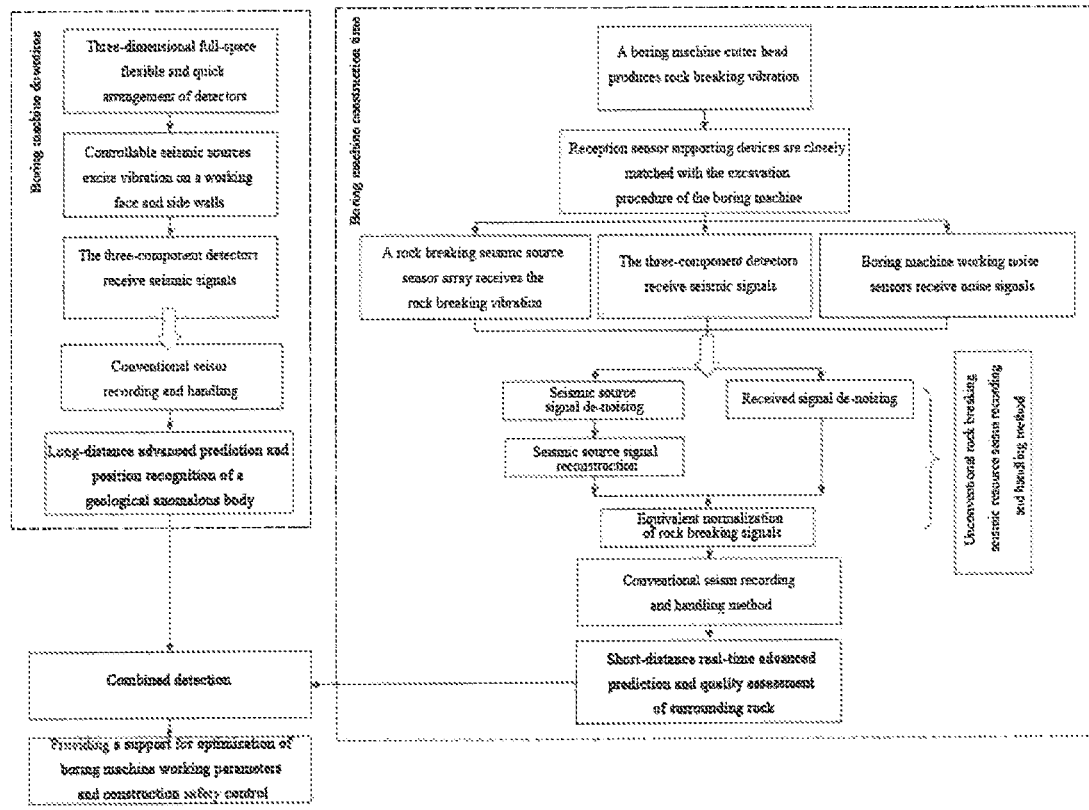
FIG. 5 is a flow diagram of a rock breaking seismic source and active source three-dimensional seismic combined advanced detection method using a tunnel boring machine.

As shown in FIG. 5, a rock breaking seismic source and active source three-dimensional seismic combined advanced detection method using a tunnel boring machine, which uses the above devices, includes the following steps:

(1) Firstly, it is an initial state when the boring machine stops, the whole reception sensors and supporting devices thereof 4 are in a retraction state, the supporting device guide rail 17 and the supporting plates 12 are positioned at the forefront of a movable path, the radial hydraulic supporting rods 16 and the front hydraulic supporting rods 11 are simultaneously in a contraction state, and the rear hydraulic supporting rods 15 are in a stretching state.

(2) When the advanced detection of the active source seismic method is to start, three-dimensional full-space flexible and quick arrangement of three-component detectors 13 is realized in a tunnel by using the reception sensor supporting devices 4, the radial hydraulic supporting rods 16 slowly elongate to drive the front hydraulic supporting rods 11 and the rear hydraulic supporting rods 15 to elongate at the same time, and the supporting plates 12 are pushed out in combination with the angle adjusting function of hinges 18 at each position till the three-component detectors 13 contact the tunnel walls; when the contact pressure between the three-component detectors 13 and the tunnel walls reaches a certain value, the detector pressure sensors 14 perform feedback adjustment on the control system to stop the motion of each hydraulic supporting rod, and then the three-component detectors 13 are in close contact with the tunnel walls.

(3) The control system controls the seismic source hydraulic telescopic rods 9 to slowly send the controllable seismic sources 7 out; when the contact pressure between the seismic sources 7 and the boring machine working face or the tunnel walls reaches a certain value, the seismic source pressure sensors 8 perform feedback adjustment on the control system to stop the motion of the seismic source hydraulic telescopic rods 9, the control system controls the controllable seismic sources 7 included in the excitation system 1 to start on vibration and generate broadband seismic wave by excitation, the controllable seismic sources 7 included in the excitation system 1 are totally excited for 12 times, the four controllable seismic sources 7 included in the working face seismic sources 2 are sequentially excited on the boring machine working face, the controllable seismic sources 7 in the side wall seismic source 3 are respectively excited for four times on the tunnel side walls of the left and right sides of the back of a boring machine main body shield, excitation points are distributed on the two cross sections, correspondingly, each three-component detector 13 can acquire 12 seismic signals, and all the signals are classified and stored in the multi-channel seismic wave data acquisition instrument.

(4) The acquired seismic wave information is automatically processed according to a conventional seism recording and handling method to obtain longitudinal and transverse wave velocity models and a three-dimensional seismic profile within a long-distance range and realize long-distance advanced prediction and position recognition of a geological anomalous body, wherein the conventional seism recording and handling method mainly comprises the following steps:

(4-1) Channel gather edition: bad channel removal and valid data length (based on prediction length) interception are realized for highlighting later handling keys, thereby improving the handling efficiency. The data length=prediction length×2×2.5÷$V_p$. In the formula, $V_p$ is the average velocity of longitudinal wave of a predicted section, 2.5 is a safety factor in view of velocity change and slow transverse wave, and 2 is two-way propagation time.

(4-2) Spherical wave diffusion real amplitude compensation: amplitude loss caused by wave-front spherical geometric diffusion of seismic wave is compensated to keep relatively real amplitude. The wave-front spherical diffusion real amplitude compensation is realized by adopting an experience compensation function $g(T)=42.1 \times T^{1.48}$, wherein T is wave-front travel time.

(4-3) Spectral analysis and band-pass filtering: seismic signals are transformed from a time domain to a frequency domain by adopting Fourier transform, thereby achieving a filtering effect according to the spectral difference between valid wave and interference wave and improving the signal-to-noise ratio of seism records.

(4-4) First arrival wave pickup: the first arrival time of longitudinal and transverse wave is determined, thereby providing necessary and reliable parameters for subsequent data processing operation. The reflection event is automatically picked up by adopting a variable time window statistical energy ratio method without manual pickup, so that the accuracy and the stability of the calculation result are greatly improved.

(4-5) Static correction of shot points: the detectors and the seismic sources are corrected to the same reference plane, and the leading or lag effect of each recorded channel seismic wave due to different seismic sources is eliminated. Since the tunnel does not have a low velocity zone of a conventional seism, linear fitting is directly performed by adopting a least squares algorithm.

(4-6) Channel gather balance: the channel gather balance specifically includes intra-channel balance and inter-channel balance, the intra-channel balance is to compress shallow wave with strong energy and increase deep wave with weak energy, so that the amplitudes of the shallow and deep seismic wave are controlled within a certain dynamic range; and the inter-channel balance is mainly to eliminate the excitation energy difference of different seismic source points, so that the amplitude of the reflected wave is not influenced by the excitation condition but only reflects the geological construction condition.

(4-7) Valid reflected wave extraction: interference wave such as acoustic wave, surface wave, direct wave and the like and invalid reflected wave in back of the boring machine working face are suppressed by adopting f-k and r-P combined filtering, and valid reflected wave from the front and the sides of the boring machine working face is automatically extracted.

(4-8) Inverse Q filtering: energy and frequency attenuation caused by inelastic bodies in the stratum are compensated, and the stretching effect of a wavelet phase is corrected, thereby fulfilling the purposes of improving weak reflected energy, improving the continuity of co-phase axes and improving the resolution of seismic data.

(4-9) Longitudinal and transverse wave separation: P wave, SH wave and SV wave received in three components of the three-component detectors are separated by adopting methods of radon transform, polarization analysis and the like, thereby facilitating next migration imaging and geological interpretation.

(4-10) Velocity analysis: longitudinal and transverse wave velocity models of rock in front of the boring machine working face are established respectively by repeated iteration of a time distance curve based on first arrival wave velocity. The velocity is scanned by adopting the common image point gather flattening criterion, that is, the picked first arrival data is converted into a seismic wave velocity, then the spatial range of a detected area is defined, and the velocity is scanned according to the lattices of the area.

(4-11) Depth migration: migration is performed on longitudinal and transverse wave seism records respectively by adopting a depth migration method based on velocity analysis, so that the obtained seismic profile can clearly and accurately show the spatial form and the real position of the wave impedance interface.

Meanwhile, according to the detection result of the above active source seismic method, subsequent bad geological conditions that may occur in excavation operation are analyzed, and subsequent boring machine construction is adjusted and optimized.

(5) Proper working parameters are selected to control the start of working of the boring machine, then the boring machine starts to work, the cutter head 5 and the boring machine main shaft 6 slowly move forward while the cutter head 5 continuously excavates the working face, the supporting device guide rail 17 thus produces backward relative movement relative to the main shaft 6, the front hydraulic supporting rods 11 are gradually elongated, the rear hydraulic supporting rods 15 are gradually shortened, and the angles are continuously adjusted under the action of the hinges 18, thereby ensuring that the absolute positions of the supporting plates 12 and the three-component detectors 13 in the tunnel are not changed.

(6) The cutter head 5 rotates and cuts rock to generate vibration, the rock breaking vibration of each hob group 19 is received by the rock breaking seismic source sensor array 20 installed in back of the cutter head 5, the rock breaking seismic sources simultaneously excite seismic wave to be diffused to the front of the boring machine working face and four sides of the tunnel, the seismic wave is reflected by the wave impedance interface and received by the three-component detectors 13 in close contact with the tunnel walls, meanwhile, the boring machine working noise sensors continuously record noise signals generated by noise sources, and the information recorded by the rock breaking seismic source sensors 20, the three-component detectors 13 and the boring machine working noise sensors is transmitted to the multi-channel seismic wave data acquisition instrument in real time.

Figure 6:
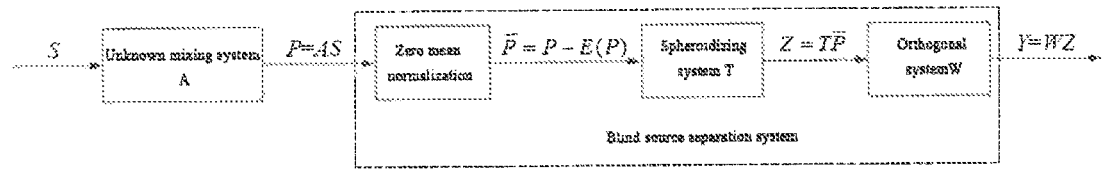
FIG. 6 is a flow diagram of a seismic source signal blind source separation method based on independent component analysis theory.

(7) The acquired seismic wave information is automatically processed according to an unconventional seism recording and handling method to obtain longitudinal and transverse wave velocity models and a three-dimensional seismic profile within a short-distance range and realize short-distance accurate prediction of a geological anomalous body, wherein the unconventional seism recording and handling method mainly comprises the following steps:

(7-1) Seismic source signal de-noising: as shown in FIG. 6, n statistically independent rock breaking seismic source signals $S=[s_1(t), s_2(t), \ldots, s_n(t)]^T$ are observed by m rock breaking seismic source sensors via an unknown mixing system A to obtain seismic source signals $P=[p_1(t), p_2(t), \ldots, p_m(t)]^T$. A linear instantaneous mixed model P=AS is obtained on the basis of independent component analysis theory, wherein A is an m×n-dimensional mixed matrix.

Blind source separation is performed on the seismic source signals P, and zero mean normalization is firstly performed on the seismic source signals P, i.e., let $\overline{P}=P-E(P)$, wherein $E(P)$ is the mathematical expectation of P and can be replaced by an arithmetic mean in practical calculation.

Then, $\overline{P}$ is spheroidized, a spheroidizing matrix $T=\Lambda^{-1}U^T$ is defined, wherein U and $\Lambda$ respectively represent a feature vector matrix and a feature value matrix of the $\overline{P}$ covariance matrix, and $\overline{P}$ is projected to the new subspace to obtain a spheroidizing vector $Z=T\overline{P}$.

Finally, the spheroidizing vector Z is orthogonally transformed to obtain a separation result Y, each component thereof is independent as much as possible and is the optimal approximation of the rock breaking seismic source signals S, specifically, a fixed point algorithm based on maximum negentropy can be adopted, and W is calculated by using the following iterative formula:

$$\begin{cases} W_{k+1} = E\{Zg(W_k^T Z)\} - E\{g'(W_k^T Z)\}W \\ W_{k+1} = \dfrac{W_{k+1}}{\|W_{k+1}\|} \end{cases}$$

Thus, noise signals are separated from valid seismic signals via blind source separation.

The value of the similarity coefficient between each independent component of the separation result Y and each component of the original seismic source signals P is further calculated, the signal with the maximum similarity coefficient is a valid seismic source signal corresponding to the hob group and is still marked as the seismic source signal there, it is supposed that $y_i=[\eta_1, \eta_2, \ldots, \eta_k]$ and $p_i=[\xi_1, \xi_2, \ldots, \xi_k]$ are respectively an arbitrary independent component of the separation result Y and an arbitrary component of the seismic source signals P, the calculation formula of the similarity coefficient is as follows:

$$R_{py} = \frac{\sum \xi_k \eta_k}{\sqrt{\sum \xi_k^2 \sum \eta_k^2}}$$

(7-2) Seismic source signal reconstruction: in view of the influence of rotation of the cutter head 5 in the construction process of the boring machine, the seismic source signals de-noised in (7-1) need to be processed to reconstruct unified seismic source signals.

Figure 7:
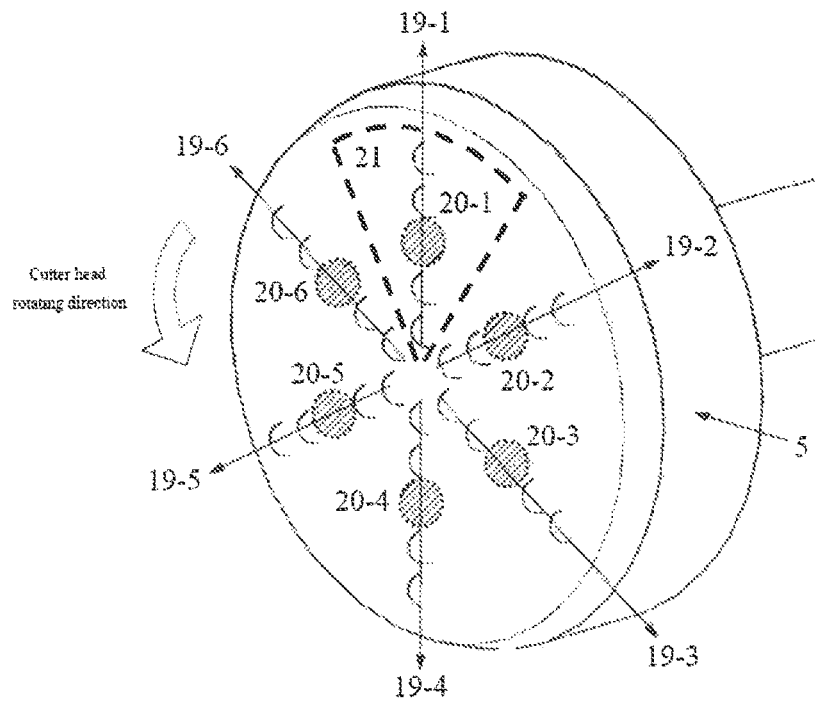
FIG. 7 is a schematic diagram of the arrangement form of a rock breaking seismic source sensor array and the division of a seismic source area.

As shown in FIG. 7, hobs are divided into six hob groups 19-1~19-6 according to the distribution condition of the hobs on the cutter head 5, and rock breaking seismic source sensors 20-1~20-6 are installed at proper positions in back of each hob group 19.

Figure 8:
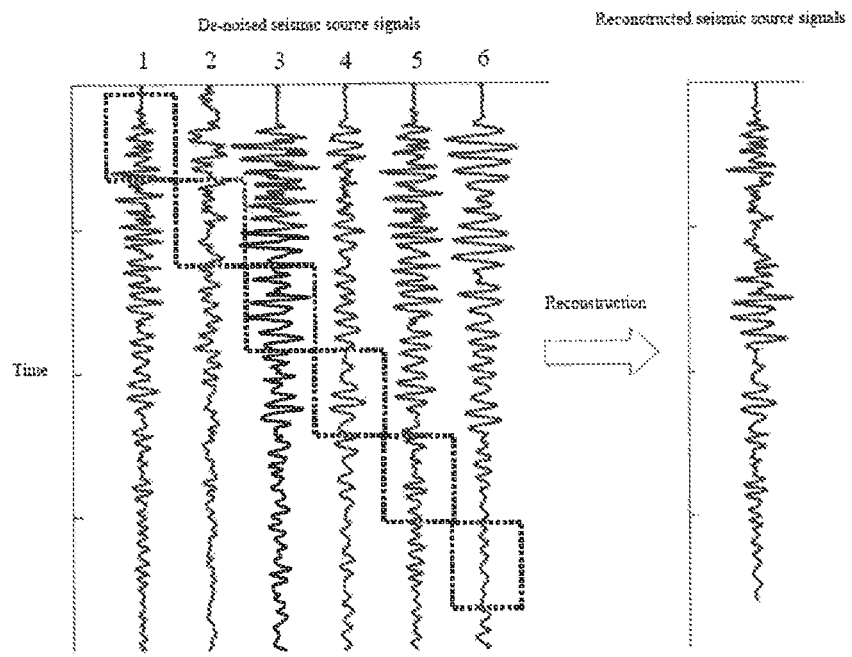
FIG. 8 is a schematic diagram of a seismic source signal reconstruction process.

Then, a seismic source area 21 is pre-assumed on the cutter head, only the hob group 19 passing through this area 21 is regarded as generating rock breaking vibration as the cutter head 5 rotates, and a signal recorded by the rock breaking seismic source sensor 20 corresponding to the hob group within this period of time is regarded as a seismic source signal fragment within this period of time. Thus, when the cutter head 5 rotates one circle, the hob groups 19-1~19-6 and the rock breaking seismic source sensors 20-1~20-6 pass through the seismic source area 21 in sequence, the seismic signals recorded by the rock breaking seismic source sensors 20-1~20-6 are shown as the left side of FIG. 8, the corresponding seismic source signal fragment in each seismic source signal is respectively extracted by the method shown in FIG. 8 according to the relative relation between the spatial position of each rock breaking seismic source sensor 20 and the seismic source area 21 at any moment, and the seismic source signal fragments are spliced into a seismic source signal according to a time sequence.

(7-3) Received signal de-noising: a convolution model $$g_i = h_i \sum_{k=1}^{M} N_k + \overline{S} l_i$$

is firstly constructed to express received signals recorded by the reception sensor array, wherein in the formula, $g_i$ is a record received by the $i^{th}$ reception sensor, $N_k$ is strong interference noise (supposing M noise sources in total) generated by the $k^{th}$ noise source, $h_i$ is a transmission function of the noise sources to the $i^{th}$ reception sensor, $\overline{S}$ is a reconstructed seismic source signal, and $l_i$ is a transmission function from the cutter head to the $i^{th}$ reception sensor.

$N_k$ can be approximately expressed as $$\hat{N}_k = \frac{1}{M} \sum_{j=1}^{M} N_{kj} e^{j\omega t_j}, N_{kj}$$

is an interference signal generated by the $k^{th}$ noise source and received by the $j^{th}$ boring machine working noise sensor, $t_j$ is the corresponding propagation time, and the transmission function $h_i$ is approximately expressed as unbiased estimate $$\hat{h}_i = \frac{E(g_i \cdot \hat{N}_i)}{E(|\hat{N}_i|^2)}.$$

Thus, detector records $$\hat{g}_i = g_i - \hat{h}_i \sum_{k=1}^{M} \hat{N}_i$$

after the above M pieces of strong interference noise are eliminated can be obtained, and then valid seismic received signals are obtained.

(7-4) Equivalent normalization of rock breaking signals: cross-correlation and de-convolution processing is performed on the seismic source signals and the de-noised received signals to further attenuate incoherent noise, and the rock breaking vibration signals are compressed into equivalent pulse signals to realize equivalent normalization of unconventional rock breaking seismic sources.

(7-5) The unconventional rock breaking seismic source seism record is transformed to the conventional seismic source seism record via (7-1)~(7-4) above, then filtering, first arrival pickup of P wave and S wave, wave field separation and migration imaging are continuously performed according to the conventional seismic source seism recording and handling method in (4), and longitudinal and transverse wave velocity models and a three-dimensional seismic profile in the front of the tunnel and surrounding areas are finally obtained.

(7-6) Relatively accurate longitudinal and transverse wave velocity models within the short-distance range of rock in front of the tunnel working face can be obtained in real time from the above rock breaking seismic source seism recording and handling result, accurate mechanical parameters (e.g., elastic modulus, Poisson's ratio, etc.) of the rock can be further obtained by calculation, and the quality of the rock can be represented and assessed by integrating the distribution conditions of longitudinal and transverse wave velocities and the mechanical parameters of the rock.

Then, a comprehensive judgment is made to the geological condition in front of the working face and the quality of the surrounding rock in combination with the results of active source and rock breaking seismic source three-dimensional seismic advanced detection, and the judgment result is fed back to a boring machine operator in real time, thereby providing a support for optimization of boring machine working parameters and construction safety control.

(8) When the boring machine cutter head 5 and the main shaft 6 reach the maximum strokes, the boring machine stops working, the radial hydraulic supporting rods 16 are slowly shortened to drive the front hydraulic supporting rods 11 and the rear hydraulic supporting rods 15 to shorten simultaneously, the whole reception sensors and supporting devices thereof 4 are retracted in combination with the angle adjusting function of hinges 18 at each position, and at the moment, the supporting device guide rail 17 and the supporting plates 12 are positioned at the rearmost end of the movable path.

(9) Finally, the supporting plates 12 are driven by the supporting device guide rail 17 to move forward to the forefront of the movable path together, correspondingly, the front hydraulic supporting rods 11 are shortened, the rear hydraulic supporting rods 15 are elongated, the reception sensors and supporting devices thereof 4 are restored to the state when the boring machine stops in (1), and next turn of operation can be continuously performed.

The specific embodiments of the present invention are described above in combination with the accompany drawings, but they do not limit the protection scope of the present invention. It should be appreciated by those skilled in the art that various modifications or variations made by those skilled in the art without any creative effort based on the technical solutions of the present invention are still within the protection scope of the present invention.

The invention claimed is:

1. A rock breaking seismic source and active source three-dimensional seismic combined advanced detection system using a tunnel boring machine, comprising an excitation system, reception sensors and supporting devices thereof, a rock breaking seismic source sensor array, boring machine working noise sensors, a control system and a multi-channel seismic wave data acquisition instrument, wherein the excitation system comprises working face seismic sources and a side wall seismic source, the working face seismic sources are arranged on a working face of a boring machine cutter head, the side wall seismic source is arranged on a boring machine main shaft, the cutter head is fixed on the boring machine main shaft, and three groups of reception sensors and supporting devices thereof distributed annularly taking the main shaft as a center are arranged at a middle section of the boring machine main shaft, correspond to a vault and left and right haunches of tunnel walls of a tunnel respectively and are used for receiving seismic signals reflected after rock breaking vibration of the cutter head encounters a geological anomalous body when being propagated in a stratum;

the rock breaking seismic source sensor array is installed in the boring machine cutter head, rock breaking seismic source sensors are installed in the cutter head according to a distribution condition of hobs on the cutter head, and a plurality of rock breaking seismic source sensors constitute the rock breaking seismic source sensor array;

the boring machine working noise sensors are installed at boring machine noise sources, and are used for recording noise signals generated by the noise sources;

the control system controls a vibration condition and motion of the excitation system;

the multi-channel seismic wave data acquisition instrument is connected with the rock breaking seismic source sensor array, three-component detectors of the three groups of reception sensors, and the boring machine working noise sensors, and is used for storing and processing seismic wave information recorded by the three-component detectors;

the excitation system is divided into the working face seismic sources and the side wall seismic source disposed at different positions; each working face seismic source comprises a controllable seismic source, a seismic source pressure sensor, a seismic source hydraulic telescopic rod and a seismic source access hatch; and the side wall seismic source comprises a controllable seismic source, a seismic source pressure sensor, a seismic source hydraulic telescopic rod and a seismic source guide rail;

a plurality of the working face seismic sources are arranged on the boring machine cutter head symmetrically with respect to each other, positions of the working face seismic sources are based on the distribution condition of hobs on the cutter head, a plurality of working face seismic source accesses are disposed at positions of the cutter head corresponding to the positions of the working face seismic sources, and each seismic source access hatch moves along clamping grooves under the control of the control system to open and close the seismic source accesses and realize entry and exit of the working face seismic sources to and from the working face of the cutter head;

the side wall seismic source is positioned on the seismic source guide rail, the seismic source guide rail comprises a circular slip ring guide rail and a rail along the boring machine main shaft, and the controllable seismic source of the side wall seismic source freely slides on the seismic source guide rail in the front-back direction of the main shaft and simultaneously can freely rotate 360° around the main shaft, thereby realizing three-dimensional adjustable arrangement of the side wall seismic source;

the controllable seismic source and the seismic source pressure sensor of the side wall seismic source are installed on the seismic source hydraulic telescopic rod, and the controllable seismic source, the seismic source pressure sensor and the seismic source hydraulic telescopic rod are respectively connected with the control system via connecting lines, wherein the seismic source hydraulic telescopic rod is hollow in design;

the three groups of reception sensors and supporting devices each specifically comprises one of the three-component detectors, a detector pressure sensor, a front hydraulic supporting rod, a rear hydraulic supporting rod, radial hydraulic supporting rods, a supporting plate and a supporting device guide rail respectively, wherein one end of the front hydraulic supporting rod is connected with the boring machine main shaft while the other end is connected with one end of the supporting plate, the other end of the supporting plate is connected with one end of the rear hydraulic supporting rod, and the other end of the rear hydraulic supporting rod is connected to the boring machine main shaft;

the supporting device guide rail is annularly nested onto the boring machine main shaft, one end of each of the radial hydraulic supporting rods is installed on the supporting device guide rail, the other ends of the radial hydraulic supporting rods are connected with a surface of the supporting plate, and the three-component detector and the detector pressure sensor are installed on the supporting plate.

2. The rock breaking seismic source and active source three-dimensional seismic combined advanced detection system using a tunnel boring machine according to claim 1, wherein the hobs on the cutter head are grouped according to the distribution condition of the hobs on the cutter head, rock breaking seismic source sensors of the rock breaking seismic source sensor array record rock breaking seismic source signals, the rock breaking seismic source signals comprise valid signals and noise signals, and each rock breaking seismic source sensor is also provided with a positioning unit which can acquire and record the spatial position thereof.

3. A method of using the advanced detection system of claim 2, comprising the following steps:

(1) when the tunnel boring machine stops working, three-dimensional adjustment of the three-component detectors is realized in a tunnel by using the reception sensor supporting devices, each supporting plate is adjusted so that the three-component detectors are in close contact with tunnel walls, the controllable seismic sources excite on the working face and a side wall nearby the working face respectively, seismic wave is reflected by a wave impedance interface of the geological anomalous body and then received by the three-component detectors in close contact with the tunnel walls, the recorded seismic wave information is transmitted to the multi-channel seismic wave data acquisition instrument in real time, the acquired seismic wave information is automatically processed according to a first seism recording and handling method to obtain longitudinal and transverse wave velocity models and a three-dimensional seismic profile within a long-distance range (0~120 m in front of the working face) and realize long-distance advanced prediction and position recognition of the geological anomalous body, and subsequent boring machine tunnel construction is adjusted and optimized according to a long-distance advanced detection result;

(2) boring machine tunnel construction parameters are selected based on the long-distance advanced detection result, the boring machine starts to work, the cutter head rotates and cuts rock to generate vibration, the reception sensor supporting devices are closely combined with the excavation procedure of the boring machine to ensure that the absolute positions of the supporting plates and the three-component detectors in the tunnel are not changed, the rock breaking vibration of each hob group is received by the rock breaking seismic source sensor array installed in the cutter head, the rock breaking seismic sources simultaneously excite seismic wave to be diffused to the front of the boring machine working face and all sides of the tunnel, the seismic wave is reflected by the wave impedance interface and received by the three-component detectors in close contact with the tunnel walls, while the boring machine working noise sensors continuously record noise signals generated by the noise sources, the recorded information is transmitted to the multi-channel seismic wave data acquisition instrument in real time, the acquired seismic wave information is automatically processed according to a second rock breaking seismic source seism recording and handling method to obtain longitudinal and transverse wave velocity models and a three-dimensional seismic profile within a short-distance range (0~60 m in front of the working face) and realize real-time short-distance prediction of the geological anomalous body, and the quality of surrounding rock of an area to be excavated is represented and assessed; and (3) finally, a determination is made to the geological condition in front of the working face and the quality of the surrounding rock in combination with the results of active source and rock breaking seismic source three-dimensional seismic advanced detection, and the determination is fed back to a boring machine operator in real time, thereby providing a support for optimization of boring machine working parameters and construction safety control.

4. The method according to claim 3, wherein in step (1), when the advanced detection of the active source seismic method is to start, three-dimensional adjustment of the reception sensors is realized in a tunnel by using reception sensor supporting devices: the radial hydraulic supporting rods slowly elongate to drive the front hydraulic supporting rods and the rear hydraulic supporting rods to elongate at the same time, and the supporting plates are pushed out in combination with an angle adjusting function of hinges at each position till the three-component detectors contact the tunnel walls; in order to ensure that the three-component detectors can be in close contact with the tunnel walls and simultaneously prevent the three-component detectors from being damaged due to too long push-out distance of each hydraulic supporting rod, when the contact pressure between the three-component detectors and the tunnel walls reaches a certain value, the detector pressure sensors perform feedback adjustment on the control system to stop the motion of each hydraulic supporting rod, and then the three-component detectors are in close contact with the tunnel walls;

in step (1), the control system controls the seismic source hydraulic telescopic rods to slowly send the controllable seismic sources out; when the contact pressure between the seismic sources and the boring machine working face or the tunnel walls reaches a certain value, the seismic source pressure sensors perform feedback adjustment on the control system to stop the motion of the seismic source hydraulic telescopic rods, the control system controls the controllable seismic sources included in the excitation system to start on vibration and generate broadband seismic wave by excitation, and all signals are classified and stored in the multi-channel seismic wave data acquisition instrument.

5. The method according to claim 3, wherein in step (2), the boring machine starts to work, the cutter head and the boring machine main shaft slowly move forward while the cutter head continuously excavates the working face, the supporting device guide rail thus produces backward relative movement relative to the main shaft, the front hydraulic supporting rods are gradually elongated, the rear hydraulic supporting rods are gradually shortened, and angles are continuously adjusted under the action of hinges, thereby ensuring that the absolute positions of the supporting plates and the three-component detectors in the tunnel are not changed, that is, the supporting plates and the three-component detectors do not move relative to the tunnel walls in the excavation process, and then ensuring that the sensors can well receive seismic signals;

in step (2), the cutter head rotates and cuts rock to generate vibration, the rock breaking vibration of each hob group is received by the rock breaking seismic source sensor array installed in the cutter head, the rock breaking seismic sources simultaneously excite seismic wave to be diffused to the front of the boring machine working face and all sides of the tunnel, the seismic wave is reflected by the wave impedance interface and received by the three-component detectors in close contact with the tunnel walls, meanwhile, the boring machine working noise sensors continuously record noise signals generated by noise sources, and the information recorded by the rock breaking seismic source sensors, the three-component detectors and the boring machine working noise sensors is transmitted to the multi-channel seismic wave data acquisition instrument in real time;

in step (2), when the boring machine cutter head and the main shaft reach maximum strokes, the boring machine stops working, the radial hydraulic supporting rods are slowly shortened to drive the front hydraulic supporting rods and the rear hydraulic supporting rods to shorten, the whole reception sensors and supporting devices thereof are retracted in combination with an angle adjusting function of at each position, and at the moment, the supporting device guide rail and the supporting plates are positioned at a rearmost end of the movable path; then, the supporting plates are driven by the supporting device guide rail to move forward to the forefront of a movable path together, correspondingly, the front hydraulic supporting rods are shortened, the rear hydraulic supporting rods are elongated, the reception sensors and supporting devices thereof are restored to the initial state, and next turn of operation can be continuously performed.

6. The method according to claim 3, wherein in step (2), the second rock breaking seismic source seism recording and real-time automatic handling method comprises:
   (2-1) seismic source signal de-noising: blind source separation is performed on seismic source signals based on independent component analysis theory to separate noise signals from valid seismic signals, the value of the similarity coefficient between each separated signal and the seismic source signal corresponding to each hob group is further calculated, and the signal with the maximum similarity coefficient is a valid seismic source signal corresponding to the hob group and is still marked as the seismic source signal there;
   (2-2) seismic source signal reconstruction: in view of the influence of rotation of the cutter head in the construction process of the boring machine, the seismic source signals de-noised in (2-1) need to be processed to reconstruct unified seismic source signals;
   (2-3) received signal de-noising: the noise components in the received signals come from the boring machine noise sources, and in order to separate valid seismic signals, strong interference noise attenuation needs to be performed on the received signals in combination with the noise signals recorded by the boring machine working noise sensors;
   (2-4) equivalent normalization of rock breaking signals: cross-correlation and de-convolution processing is performed on the seismic source signals and the de-noised received signals to further attenuate incoherent noise, and the rock breaking vibration signals are compressed into equivalent pulse signals to realize equivalent normalization of second rock breaking seismic sources;
   (2-5) the second rock breaking seismic source seism record is transformed to the first seismic source seism record via (2-1)~(2-4) above, then filtering, first arrival pickup of P wave and S wave, wave field separation and migration imaging are continuously performed according to the first seism recording and real-time automatic handling method of (1-1)~(1-11), and longitudinal and transverse wave velocity models and a three-dimensional seismic profile in the front of the tunnel and surrounding areas are finally obtained;
   (2-6) relatively accurate longitudinal and transverse wave velocity models within the short-distance range of rock in front of the tunnel working face are obtained in real time from the above rock breaking seismic source seism recording and handling result, mechanical parameters of the rock are further obtained by calculation, and the quality of the rock can be represented and assessed by integrating the distribution conditions of longitudinal and transverse wave velocities and the mechanical parameters of the rock.

7. The method according to claim 3, wherein the specific method of step (2-2) is as follows: a seismic source area is pre-assumed on the cutter head according to the distribution condition of hobs on the cutter head, only the hob group passing through this area is regarded as generating rock breaking vibration as the cutter head rotates, a signal recorded by the rock breaking seismic source sensor corresponding to the hob group within this period of time is regarded as a seismic source signal fragment within this period of time, thus, when the cutter head rotates one circle, all hob groups and corresponding rock breaking seismic source sensors pass through the seismic source area once, the corresponding seismic source signal fragment in each seismic source signal is respectively extracted according to the relative relation recorded automatically at any moment between the spatial position of each rock breaking seismic source sensor and the seismic source area, and the seismic source signal fragments are spliced into a seismic source signal according to a time sequence.

8. The rock breaking seismic source and active source three-dimensional seismic combined advanced detection system using a tunnel boring machine according to claim 1, wherein the control system controls stretching of the seismic source hydraulic telescopic rods, the front hydraulic supporting rods, the rear hydraulic supporting rods and the radial hydraulic supporting rods, and performs feedback adjustment on the seismic source hydraulic telescopic rods, the front hydraulic supporting rods, the rear hydraulic supporting rods and the radial hydraulic supporting rods under the action of signals of the seismic source pressure sensors and the detector pressure sensors; in addition, the control system is also used for adjusting vibration conditions of the controllable seismic sources, and simultaneously can control the movement of the seismic source guide rail, the supporting device guide rail and the seismic source access hatches.

9. A method of using the advanced detection system of claim 8, comprising the following steps:
   (1) when the tunnel boring machine stops working, three-dimensional adjustment of the three-component detectors is realized in a tunnel by using the reception sensor supporting devices, each supporting plate is adjusted so that the three-component detectors are in close contact with tunnel walls, the controllable seismic sources excite on the working face and a side wall nearby the working face respectively, seismic wave is reflected by a wave impedance interface of the geological anomalous body and then received by the three-component detectors in close contact with the tunnel walls, the recorded seismic wave information is transmitted to the multi-channel seismic wave data acquisition instrument in real time, the acquired seismic wave information is automatically processed according to a first seism recording and handling method to obtain longitudinal and transverse wave velocity models and a three-dimensional seismic profile within a long-distance range (0~120 m in front of the working face) and realize long-distance advanced prediction and position recognition of the geological anomalous body, and subsequent boring machine tunnel construction is adjusted and optimized according to a long-distance advanced detection result;
   (2) boring machine tunnel construction parameters are selected based on the long-distance advanced detection result, the boring machine starts to work, the cutter head rotates and cuts rock to generate vibration, the reception sensor supporting devices are closely combined with the excavation procedure of the boring machine to ensure that the absolute positions of the supporting plates and the three-component detectors in the tunnel are not changed, the rock breaking vibration of each hob group is received by the rock breaking seismic source sensor array installed in the cutter head, the rock breaking seismic sources simultaneously excite seismic wave to be diffused to the front of the boring machine working face and all sides of the tunnel, the seismic wave is reflected by the wave impedance interface and received by the three-component detectors in close contact with the tunnel walls, while the boring machine working noise sensors continuously record noise signals generated by the noise sources, the recorded information is transmitted to the multi-channel seismic wave data acquisition instrument in real time, the acquired seismic wave information is automatically processed according to a second rock breaking seismic source seism recording and handling method to obtain longitudinal and transverse wave velocity models and a three-dimensional seismic profile within a short-distance range (0~60 m in front of the working face) and realize real-time short-distance prediction of the geological anomalous body, and the quality of surrounding rock of an area to be excavated is represented and assessed; and (3) finally, a determination is made to the geological condition in front of the working face and the quality of the surrounding rock in combination with the results of active source and rock breaking seismic source three-dimensional seismic advanced detection, and the determination is fed back to a boring machine operator in real time, thereby providing a support for optimization of boring machine working parameters and construction safety control.

10. The method according to claim 9, wherein in step (1), when the advanced detection of the active source seismic method is to start, three-dimensional adjustment of the reception sensors is realized in a tunnel by using reception sensor supporting devices: the radial hydraulic supporting rods slowly elongate to drive the front hydraulic supporting rods and the rear hydraulic supporting rods to elongate at the same time, and the supporting plates are pushed out in combination with an angle adjusting function of hinges at each position till the three-component detectors contact the tunnel walls; in order to ensure that the three-component detectors can be in close contact with the tunnel walls and simultaneously prevent the three-component detectors from being damaged due to too long push-out distance of each hydraulic supporting rod, when the contact pressure between the three-component detectors and the tunnel walls reaches a certain value, the detector pressure sensors perform feedback adjustment on the control system to stop the motion of each hydraulic supporting rod, and then the three-component detectors are in close contact with the tunnel walls;

in step (1), the control system controls the seismic source hydraulic telescopic rods to slowly send the controllable seismic sources out; when the contact pressure between the seismic sources and the boring machine working face or the tunnel walls reaches a certain value, the seismic source pressure sensors perform feedback adjustment on the control system to stop the motion of the seismic source hydraulic telescopic rods, the control system controls the controllable seismic sources included in the excitation system to start on vibration and generate broadband seismic wave by excitation, and all signals are classified and stored in the multi-channel seismic wave data acquisition instrument.

11. The method according to claim 9, wherein in step (2), the boring machine starts to work, the cutter head and the boring machine main shaft slowly move forward while the cutter head continuously excavates the working face, the supporting device guide rail thus produces backward relative movement relative to the main shaft, the front hydraulic supporting rods are gradually elongated, the rear hydraulic supporting rods are gradually shortened, and angles are continuously adjusted under the action of hinges, thereby ensuring that the absolute positions of the supporting plates and the three-component detectors in the tunnel are not changed, that is, the supporting plates and the three-component detectors do not move relative to the tunnel walls in the excavation process, and then ensuring that the sensors can well receive seismic signals;

in step (2), the cutter head rotates and cuts rock to generate vibration, the rock breaking vibration of each hob group is received by the rock breaking seismic source sensor array installed in the cutter head, the rock breaking seismic sources simultaneously excite seismic wave to be diffused to the front of the boring machine working face and all sides of the tunnel, the seismic wave is reflected by the wave impedance interface and received by the three-component detectors in close contact with the tunnel walls, meanwhile, the boring machine working noise sensors continuously record noise signals generated by noise sources, and the information recorded by the rock breaking seismic source sensors, the three-component detectors and the boring machine working noise sensors is transmitted to the multi-channel seismic wave data acquisition instrument in real time;

in step (2), when the boring machine cutter head and the main shaft reach maximum strokes, the boring machine stops working, the radial hydraulic supporting rods are slowly shortened to drive the front hydraulic supporting rods and the rear hydraulic supporting rods to shorten, the whole reception sensors and supporting devices thereof are retracted in combination with an angle adjusting function of the hinges at each position, and at the moment, the supporting device guide rail and the supporting plates are positioned at a rearmost end of a movable path; then, the supporting plates are driven by the supporting device guide rail to move forward to the forefront of the movable path together, correspondingly, the front hydraulic supporting rods are shortened, the rear hydraulic supporting rods are elongated, the reception sensors and supporting devices thereof are restored to the initial state, and next turn of operation can be continuously performed.

12. The method according to claim 9, wherein in step (2), the second rock breaking seismic source seism recording and real-time automatic handling method comprises:

(2-1) seismic source signal de-noising: blind source separation is performed on seismic source signals based on independent component analysis theory to separate noise signals from valid seismic signals, the value of the similarity coefficient between each separated signal and the seismic source signal corresponding to each hob group is further calculated, and the signal with the maximum similarity coefficient is a valid seismic source signal corresponding to the hob group and is still marked as the seismic source signal there;

(2-2) seismic source signal reconstruction: in view of the influence of rotation of the cutter head in the construction process of the boring machine, the seismic source signals de-noised in (2-1) need to be processed to reconstruct unified seismic source signals;

(2-3) received signal de-noising: the noise components in the received signals come from the boring machine noise sources, and in order to separate valid seismic signals, strong interference noise attenuation needs to be performed on the received signals in combination with the noise signals recorded by the boring machine working noise sensors;

(2-4) equivalent normalization of rock breaking signals: cross-correlation and de-convolution processing is performed on the seismic source signals and the de-noised received signals to further attenuate incoherent noise, and the rock breaking vibration signals are compressed into equivalent pulse signals to realize equivalent normalization of second rock breaking seismic sources;

(2-5) the second rock breaking seismic source seism record is transformed to the first seismic source seism record via (2-1)~(2-4) above, then filtering, first arrival pickup of P wave and S wave, wave field separation and migration imaging are continuously performed according to the first seism recording and real-time automatic handling method of (1-1)~(1-11), and longitudinal and transverse wave velocity models and a three-dimensional seismic profile in the front of the tunnel and surrounding areas are finally obtained;

(2-6) relatively accurate longitudinal and transverse wave velocity models within the short-distance range of rock in front of the tunnel working face are obtained in real time from the above rock breaking seismic source seism recording and handling result, mechanical parameters of the rock are further obtained by calculation, and the quality of the rock can be represented and assessed by integrating the distribution conditions of longitudinal and transverse wave velocities and the mechanical parameters of the rock.

13. The method according to claim 9, wherein the specific method of step (2-2) is as follows: a seismic source area is pre-assumed on the cutter head according to the distribution condition of hobs on the cutter head, only the hob group passing through this area is regarded as generating rock breaking vibration as the cutter head rotates, a signal recorded by the rock breaking seismic source sensor corresponding to the hob group within this period of time is regarded as a seismic source signal fragment within this period of time, thus, when the cutter head rotates one circle, all hob groups and corresponding rock breaking seismic source sensors pass through the seismic source area once, the corresponding seismic source signal fragment in each seismic source signal is respectively extracted according to the relative relation recorded automatically at any moment between the spatial position of each rock breaking seismic source sensor and the seismic source area, and the seismic source signal fragments are spliced into a seismic source signal according to a time sequence.

14. A method of using the advanced detection system of claim 1, comprising the following steps:
(1) when the tunnel boring machine stops working, three-dimensional adjustment of the three-component detectors is realized in a tunnel by using the reception sensor supporting devices, each supporting plate is adjusted so that the three-component detectors are in close contact with tunnel walls, the controllable seismic sources excite on the working face and a side wall nearby the working face respectively, seismic wave is reflected by a wave impedance interface of the geological anomalous body and then received by the three-component detectors in close contact with the tunnel walls, the recorded seismic wave information is transmitted to the multi-channel seismic wave data acquisition instrument in real time, the acquired seismic wave information is automatically processed according to a first seism recording and handling method to obtain longitudinal and transverse wave velocity models and a three-dimensional seismic profile within a long-distance range (0~120 m in front of the working face) and realize long-distance advanced prediction and position recognition of the geological anomalous body, and subsequent boring machine tunnel construction is adjusted and optimized according to a long-distance advanced detection result;

(2) boring machine tunnel construction parameters are selected based on the long-distance advanced detection result, the boring machine starts to work, the cutter head rotates and cuts rock to generate vibration, the reception sensor supporting devices are closely combined with the excavation procedure of the boring machine to ensure that the absolute positions of the supporting plates and the three-component detectors in the tunnel are not changed, the rock breaking vibration of each hob group is received by the rock breaking seismic source sensor array installed in the cutter head, the rock breaking seismic sources simultaneously excite seismic wave to be diffused to the front of the working face and all sides of the tunnel, the seismic wave is reflected by the wave impedance interface and received by the three-component detectors in close contact with the tunnel walls, while the boring machine working noise sensors continuously record noise signals generated by the noise sources, the recorded information is transmitted to the multi-channel seismic wave data acquisition instrument in real time, the acquired seismic wave information is automatically processed according to a second rock breaking seismic source seism recording and handling method to obtain longitudinal and transverse wave velocity models and a three-dimensional seismic profile within a short-distance range (0~60 m in front of the working face) and realize real-time short-distance prediction of the geological anomalous body, and the quality of surrounding rock of an area to be excavated is represented and assessed; and (3) finally, a determination is made of the geological condition in front of the working face and the quality of the surrounding rock in combination with the results of active source and rock breaking seismic source three-dimensional seismic advanced detection, and the determination is fed back to a boring machine operator in real time, thereby providing a support for optimization of boring machine working parameters and construction safety control.

15. The method according to claim 14, wherein in step (1), when the advanced detection of the active source seismic method is to start, three-dimensional adjustment of the reception sensors is realized in the tunnel by using reception sensor supporting devices: the radial hydraulic supporting rods slowly elongate to drive the front hydraulic supporting rods and the rear hydraulic supporting rods to elongate at the same time, and the supporting plates are pushed out in combination with an angle adjusting function of hinges at each position till the three-component detectors contact the tunnel walls; in order to ensure that the three-component detectors can be in close contact with the tunnel walls and simultaneously prevent the three-component detectors from being damaged due to too long push-out distance of each hydraulic supporting rod, when the contact pressure between the three-component detectors and the tunnel walls reaches a certain value, the detector pressure sensors perform feedback adjustment on the control system to stop the motion of each hydraulic supporting rod, and then the three-component detectors are in close contact with the tunnel walls;

in step (1), the control system controls the seismic source hydraulic telescopic rods to slowly send the controllable seismic sources out; when the contact pressure between the seismic sources and the boring machine working face or the tunnel walls reaches a certain value, the seismic source pressure sensors perform feedback adjustment on the control system to stop the motion of the seismic source hydraulic telescopic rods, the control system controls the controllable seismic sources included in the excitation system to start on vibration and generate broadband seismic wave by excitation, and all signals are classified and stored in the multi-channel seismic wave data acquisition instrument.

16. The method according to claim 14, wherein in step (2), the boring machine starts to work, the cutter head and the boring machine main shaft slowly move forward while the cutter head continuously excavates the working face, the supporting device guide rail thus produces backward relative movement relative to the main shaft, the front hydraulic supporting rods are gradually elongated, the rear hydraulic supporting rods are gradually shortened, and angles are continuously adjusted under the action of hinges, thereby ensuring that the absolute positions of the supporting plates and the three-component detectors in the tunnel are not changed, that is, the supporting plates and the three-component detectors do not move relative to the tunnel walls in the excavation process, and then ensuring that the sensors can well receive seismic signals;

in step (2), the cutter head rotates and cuts rock to generate vibration, the rock breaking vibration of each hob group is received by the rock breaking seismic source sensor array installed in the cutter head, the rock breaking seismic sources simultaneously excite seismic wave to be diffused to the front of the boring machine working face and all sides of the tunnel, the seismic wave is reflected by the wave impedance interface and received by the three-component detectors in close contact with the tunnel walls, meanwhile, the boring machine working noise sensors continuously record noise signals generated by noise sources, and the information recorded by the rock breaking seismic source sensors, the three-component detectors and the boring machine working noise sensors is transmitted to the multi-channel seismic wave data acquisition instrument in real time;

in step (2), when the boring machine cutter head and the main shaft reach maximum strokes, the boring machine stops working, the radial hydraulic supporting rods are slowly shortened to drive the front hydraulic supporting rods and the rear hydraulic supporting rods to shorten, the whole reception sensors and supporting devices thereof are retracted in combination with an angle adjusting function of the hinges at each position, and at the moment, the supporting device guide rail and the supporting plates are positioned at a rearmost end of a movable path; then, the supporting plates are driven by the supporting device guide rail to move forward to the forefront of the movable path together, correspondingly, the front hydraulic supporting rods are shortened, the rear hydraulic supporting rods are elongated, the reception sensors and supporting devices thereof are restored to the initial state, and next turn of operation can be continuously performed.

17. The method according to claim 14, wherein in step (2), the second rock breaking seismic source seism recording and real-time automatic handling method comprises:

(2-1) seismic source signal de-noising: blind source separation is performed on seismic source signals based on independent component analysis theory to separate noise signals from valid seismic signals, the value of the similarity coefficient between each separated signal and the seismic source signal corresponding to each hob group is further calculated, and the signal with the maximum similarity coefficient is a valid seismic source signal corresponding to the hob group and is still marked as the seismic source signal there;

(2-2) seismic source signal reconstruction: in view of the influence of rotation of the cutter head in the construction process of the boring machine, the seismic source signals de-noised in (2-1) need to be processed to reconstruct unified seismic source signals;

(2-3) received signal de-noising: the noise components in the received signals come from the boring machine noise sources, and in order to separate valid seismic signals, strong interference noise attenuation needs to be performed on the received signals in combination with the noise signals recorded by the boring machine working noise sensors;

(2-4) equivalent normalization of rock breaking signals: cross-correlation and de-convolution processing is performed on the seismic source signals and the de-noised received signals to further attenuate incoherent noise, and the rock breaking vibration signals are compressed into equivalent pulse signals to realize equivalent normalization of second rock breaking seismic sources;

(2-5) the second rock breaking seismic source seism record is transformed to the first seismic source seism record via (2-1)~(2-4) above, then filtering, first arrival pickup of P wave and S wave, wave field separation and migration imaging are continuously performed according to the first seism recording and real-time automatic handling method of (1-1)~(1-11), and longitudinal and transverse wave velocity models and a three-dimensional seismic profile in the front of the tunnel and surrounding areas are finally obtained;

(2-6) relatively accurate longitudinal and transverse wave velocity models within the short-distance range of rock in front of the tunnel working face are obtained in real time from the above rock breaking seismic source seism recording and handling result, mechanical parameters of the rock are further obtained by calculation, and the quality of the rock can be represented and assessed by integrating the distribution conditions of longitudinal and transverse wave velocities and the mechanical parameters of the rock.

18. The method according to claim 14, wherein the specific method of step (2-2) is as follows: a seismic source area is pre-assumed on the cutter head according to the distribution condition of hobs on the cutter head, only the hob group passing through this area is regarded as generating rock breaking vibration as the cutter head rotates, a signal recorded by the rock breaking seismic source sensor corresponding to the hob group within this period of time is regarded as a seismic source signal fragment within this period of time, thus, when the cutter head rotates one circle, all hob groups and corresponding rock breaking seismic source sensors pass through the seismic source area once, the corresponding seismic source signal fragment in each seismic source signal is respectively extracted according to the relative relation recorded automatically at any moment between the spatial position of each rock breaking seismic source sensor and the seismic source area, and the seismic source signal fragments are spliced into a seismic source signal according to a time sequence.

* * * * *